United States Patent
Chigusa

(10) Patent No.: US 7,729,825 B2
(45) Date of Patent: Jun. 1, 2010

(54) SYSTEM AND METHOD OF INTELLIGENT AGENT MANAGEMENT USING AN AGENT INTERFACE FOR USE IN VEHICLE DIAGNOSTICS

(75) Inventor: Shunsuke Chigusa, Arlington, MA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 875 days.

(21) Appl. No.: 11/478,427

(22) Filed: Jun. 29, 2006

(65) Prior Publication Data

US 2008/0039069 A1    Feb. 14, 2008

(51) Int. Cl.
*G06F 17/00* (2006.01)
*G06F 19/00* (2006.01)

(52) U.S. Cl. ...................................................... 701/33
(58) Field of Classification Search ........................ None
See application file for complete search history.

(56) References Cited

U.S. PATENT DOCUMENTS

| | | | |
|---|---|---|---|
| 5,124,909 A | 6/1992 | Blakely et al. |
| 5,375,207 A | 12/1994 | Blakely et al. |
| 5,870,768 A | 2/1999 | Hekmatpour |
| 5,944,783 A | 8/1999 | Nieten |
| 5,953,514 A | 9/1999 | Gochee |
| 6,012,152 A | 1/2000 | Douik et al. |
| 6,023,565 A | 2/2000 | Lawman et al. |
| 6,108,616 A | 8/2000 | Borchers et al. |
| 6,349,342 B1 | 2/2002 | Menges et al. |
| 6,505,231 B1 | 1/2003 | Maruyama et al. |
| 6,684,285 B2 | 1/2004 | Farmwald et al. |
| 6,769,125 B2 | 7/2004 | Menges et al. |
| 6,912,522 B2 | 6/2005 | Edgar |
| 6,950,782 B2 | 9/2005 | Qiao et al. |
| 6,988,279 B1 | 1/2006 | Kanevsky |
| 6,996,667 B2 | 2/2006 | Aoki et al. |
| 7,036,128 B1 | 4/2006 | Julia et al. |
| 7,233,879 B1 | 6/2007 | Chigusa |
| 2002/0120696 A1 | 8/2002 | Mousseau et al. |
| 2003/0037177 A1 | 2/2003 | Sutton et al. |

(Continued)

OTHER PUBLICATIONS

IPM, 'Wireless Vehicle Interfact' IPM Article, 2000, pp. 1-2.

(Continued)

*Primary Examiner*—Michael J. Zanelli
(74) *Attorney, Agent, or Firm*—Gifford, Krass, Sprinkle, Anderson & Citkowski, P.C.

(57) ABSTRACT

A system and method of intelligent agent management using an agent interface within a vehicle intelligent agent system is provided. The system includes a host system, and a local system in communication with the host system via a communications means. The system includes an intelligent agent that carries instructions or information regarding a task to be performed by the agent. The system further includes an interface having a processor and memory. The methodology includes the steps of the interface facilitating the transfer of instructions carried by the agent to the interface, copying predetermined information from the host system database into the interface memory, and assembling, by the interface processor, the agent instructions and stored information. The methodology further includes the steps of transferring the assembled instructions from the interface to the local processor, and transferring the assembled instructions from the local processor to the agent for execution.

8 Claims, 2 Drawing Sheets

U.S. PATENT DOCUMENTS

| | | |
|---|---|---|
| 2004/0205772 A1 | 10/2004 | Uszok et al. |
| 2005/0004974 A1 | 1/2005 | Sharma et al. |
| 2005/0027480 A1 | 2/2005 | Qiao et al. |
| 2005/0187668 A1 | 8/2005 | Baumgarte |
| 2005/0216757 A1 | 9/2005 | Gardner |
| 2006/0031538 A1 | 2/2006 | Motoyama et al. |
| 2006/0064291 A1 | 3/2006 | Pattipatti et al. |
| 2006/0168195 A1* | 7/2006 | Maturana et al. ............ 709/224 |
| 2007/0265735 A1 | 11/2007 | Chigusa |

OTHER PUBLICATIONS

Murphey at al., 'Automotive Fault Diagnosis;—Part II: A Distributed Agent Diagnostic System', Jul. 2003. IEEE Article, vol. 52, No. 4, pp. 1076-1098.

Robbert-Jan Beun et al. "Ontological Feedback in Multiagent Systems" Autonomous Agents and Multi-Agent Systems '04 Conference, Jul. 19-23, 2004, New York, NY USA, pp. 110-117.

Weiss et al., 'Design and Implementation of a Real-Time Multi-Agent System', 1998, IEEE Article, pp. 1269-1273.

* cited by examiner

SYSTEM AND METHOD OF INTELLIGENT AGENT MANAGEMENT USING AN AGENT INTERFACE FOR USE IN VEHICLE DIAGNOSTICS

BACKGROUND OF THE INVENTION

1. Field of the Invention

The present invention relates generally to computer-assisted vehicle diagnostics and, more specifically, to a system and method of intelligent agent management using an agent interface, for use in vehicle diagnostics.

2. Description of the Related Art

Vehicles, and in particular motor vehicles, frequently incorporate monitoring systems that function to monitor the status of various vehicle components. An on-board diagnostic system (OBD) is frequently utilized in monitoring the engine, emissions, transmission or other key vehicle systems. The information obtained by such a monitoring system may be useful in detecting a vehicle condition, such as a malfunction, or other such abnormal operating condition. A key feature of the on-board diagnostic system is the ability to notify the vehicle operator of the detected vehicle condition. Early detection, diagnosis, or notification of a malfunction is important to the continued operation of the vehicle.

While the on-board diagnostic systems work well, they may not provide information regarding causation. Intelligent agent diagnostic systems are known to collect and transfer data within an electronic system that may be relevant to causation. An example of a multi-agent diagnostic system for a vehicle that can detect and isolate a fault is described in commonly assigned U.S. patent application Ser. No. 10/629, 035, which is incorporated herein by reference.

The above-described system works well for fault isolation. A system and method of intelligent agent identification is disclosed in commonly assigned U.S. patent application Ser. No. 11/282,925, which is incorporated by reference. Agent identification provides security for the ingress and egress of an agent at the vehicle level. Another example of a system and method of intelligent agent management for an intelligent agent system improves the security of the intelligent agent system by searching for a malicious agent using an overseer agent, as is disclosed in commonly assigned U.S. patent application Ser. No. 11/411,289, which is incorporated herein by reference. A further example of a system and method of intelligent agent management provides for self-repair of the agent, as disclosed in commonly assigned U.S. patent application Ser. No. 11/430,382, which is also incorporated herein by reference.

SUMMARY OF THE INVENTION

Accordingly, the present invention is a system and method of intelligent agent management using an agent interface within an intelligent agent system of a vehicle. The system includes a host system having a processor, a memory associated with the processor and an input/output means and a local system having a processor, a memory associated with the processor and an input/output means. The system also an agent operatively in communication with the local system and host system via a communication network. The system further includes an interface that includes a processor and a memory, and is in communication with the rest of the local system and the agent via the communications means.

The method includes the steps of receiving an agent by a local intelligent agent system for the vehicle and transferring instructions carried by the agent to the interface within the local system, and the instructions includes information regarding a task to be performed by the agent. The method still also includes the steps of copying predetermined information from the host system database into the memory portion of the interface via a communications network, and assembling the agent instructions together with the stored information by the interface processor. The methodology further includes the steps of transferring assembled instructions from the interface to the local system processor and transferring the assembled instructions from the local system processor to the agent. The methodology still includes the steps of executing the assembled instructions by the agent.

One advantage of the present invention is that a system and method of intelligent agent management for an intelligent agent system is provided that improves communication within the system. Another advantage of the present invention is that a system and method of intelligent agent management is provided that reduces the amount of program information carried by the agent by improving the allocation of resources within the electronic system for the vehicle. Still another advantage of the present invention is that a system and method of intelligent agent management is provided that utilizes an interface between the agent and the local system to allocate and better utilize the resources of the local system.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
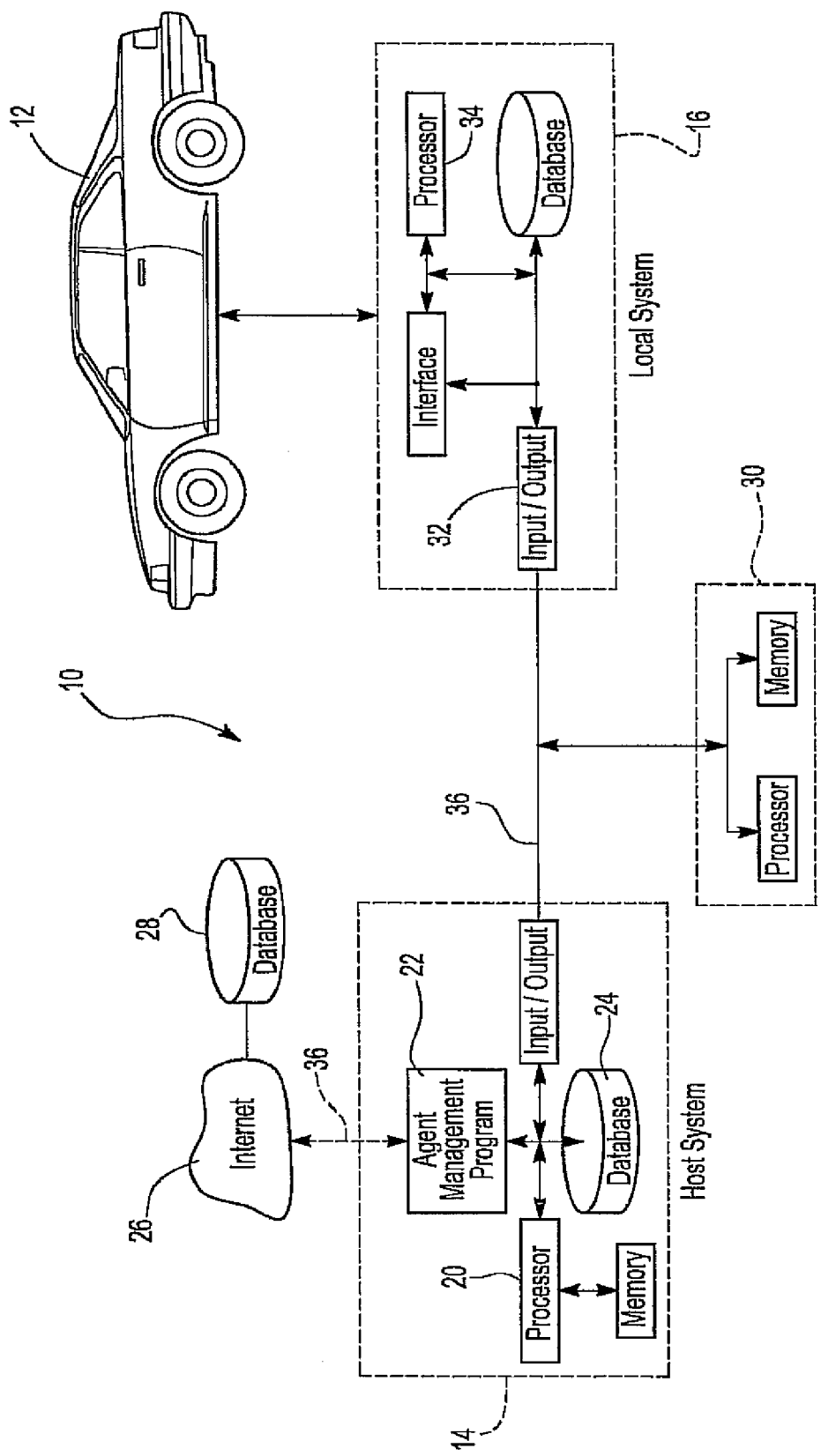
FIG. 1 is a diagrammatic view of a system for use in conjunction with a method of agent management using an agent interface in an electronic system, according to the present invention.
Figure 2:
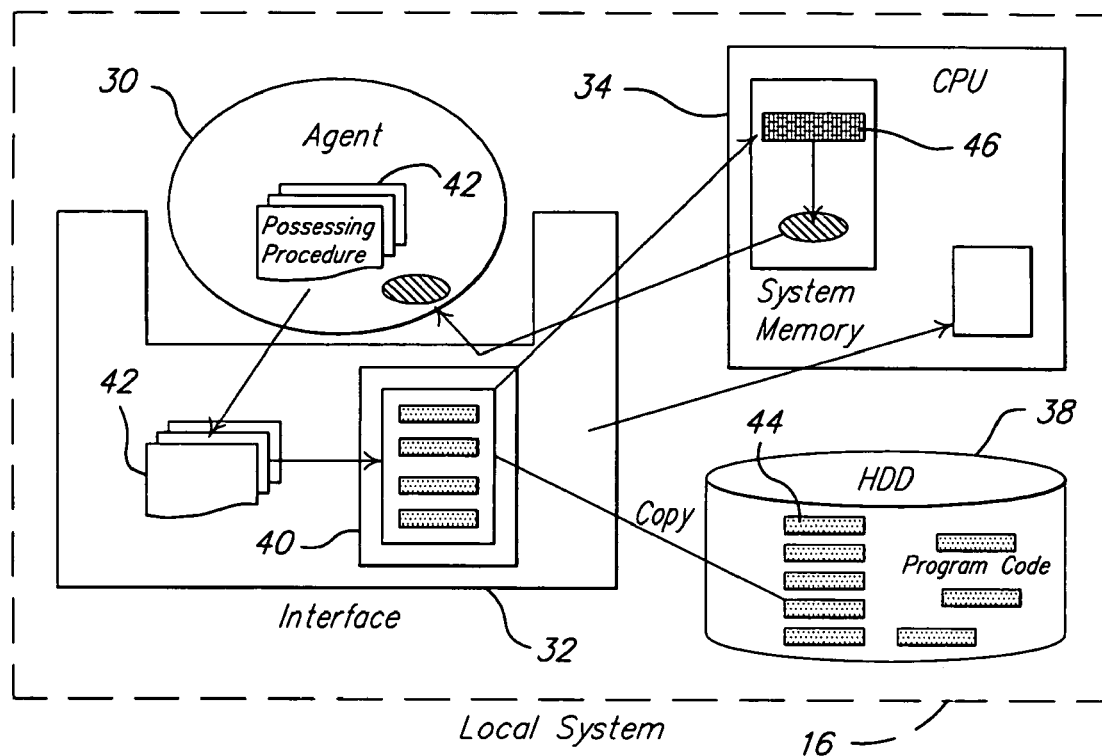
FIG. 2 is a further diagrammatic view of the slave system of FIG. 1, according to the present invention.

Referring to FIGS. 1 and 2, a system 10 for intelligent agent management using an agent interface in an electronic system is provided. In this example, the electronic system is incorporated in a vehicle 12, and in particular an automobile. The vehicle electronic system includes an intelligent diagnosis and repair feature. Expert agents, each having a specific function, are dispersed within the electronic system of the vehicle in order to monitor its behavior.

The system 10 for agent management using an agent interface includes at least one intelligent agent 30 disposed within the vehicle electronic system in a predetermined manner. For example, the agents 30 may be arranged in hierarchical layers. The intelligent agent 30 includes a microprocessor, a memory, a database, an input, an output and necessary operating software. The intelligent agent 30 encompasses many forms. For example, the intelligent agent 30 may be a sensing means, such as a sensor, or an electronic control. The intelligent agent 30 may also be an Application Specific Integrated Circuit (ASIC) incorporated into a computer controller. As such, the system may simultaneously include various types of agents, depending on the diagnostic task to be performed. One function of the agent 30 is to carry information 42 or instructions in the form of executable program code to a particular component in the electronic system of the vehicle. The executable program code may contain instructions directing the agent to perform a particular function. One function is to obtain data that is analyzed and utilized by the vehicle. Another function of the agent 30 is to gather new information or knowledge through data logging, user input or output or diagnostics or the like. In this example, the collected data is used for intelligent vehicle diagnostics. The instructions may be stored within the agent processor. The size of the agent 30 depends on the function and executable instructions carried by the agent 30.

It should be appreciated that recognition of the agent 30 is advantageous in preserving the integrity of the information. A non-identified agent or a non-conforming agent 30 may carry information that could have a negative impact on the vehicle 12. The agent 30 may be identified within the system 10 using an identification code, or other identification information useful for identification verification purposes. The type of identification information may be a name or number or the like and the format is non-limiting. An example of a method of identifying the agent 30 is disclosed in commonly assigned U.S. patent application Ser. No. 11/282,925, which is incorporated by reference.

The system for agent management 10 includes a communication network 36 that selectively receives, transmits or monitors data communications between the various components within the system 10. Various different types of communication means may be simultaneously incorporated within the communication network 36. The communication means may be wired or wireless type connection, or the like. An example of a wired communication means is a data bus. An example of a LAN/WAN communication means is an intranet or internet 26. The communication network 36 may include other types of linked communication devices, such as facsimile, telephone, pagers or cellular phones or the like.

The intelligent agent management system 10 includes a host system 14 operatively in communication with a local system 16 or the agent 30 via the communication network 36. The local system 16 is also operatively in communication with the agent 30 via the communications network 36. The host system 14 includes a processor 20 having a memory means, a data storage device 24, an input/output interface means, and operational software programs 22. The host data storage device may be a fixed memory device having a database or the like, or a removable memory device 24. In this example, the host system 14 is a server. It should be appreciated that various other peripheral devices may be connected to the host system 14, such as another remotely located data storage device 28, or another computer system (not shown). Preferably, the host system 14 is a central computer facility remotely located from the vehicle.

The local system 16 is typically located at the vehicle level. An example of a local system 16 for a vehicle is an electronic control unit, or ECU. The local system 16 includes an input means, a processor 34 having a memory means, a communication means, an output means and a local data storage device 38. For example, the processor is a CPU having a controller and a memory. The local data storage device 38 may be a fixed memory device having a database or the like, or a removable memory device.

The host computer system 14 and the local computer system 16 each maintain various software programs necessary to the operation of the system. For example, an agent management software program 22 coordinates the functions of the various agents 30 disposed within the system. An example of an agent management program 22 is disclosed in commonly assigned U.S. patent application Ser. No. 11/282,925, which is incorporated by reference. In particular, the agent management software program 22 coordinates activities such as the addition of an agent, the deletion of an agent, the education of an agent and the generation of identification code for the agent, or the like. The agent management program 22 also coordinates communications within the system 10.

The local system 16 further includes an interface 32, as shown in FIG. 2, that facilitates the processing of the instructions carried by the agent 30. The interface 32 is operatively in communication with the agents 30, as well as the rest of the system 10 via the previously described communication network 36. The interface 32 may include a processor or controller 40. In this example, the processor is a central processing unit (CPU) 40. The interface stores data 42, such as a process plan, process sequence for implementing the instructions and process content of the instructions. The use of the interface 32 advantageously reduces the size of the program instructions carried by the agent 30. Therefore, the agent utilizes the resources of the local system 16, including program code, system memory, database 38 or the like as necessary to carry out its responsibilities.

The system 10 may include other components or features relevant to the above-described system and the method to be described. For example, the system 10 may include an indicator means (not shown) for providing a message to the vehicle operator. The indicator means may be a visual means, such as an LED, CRT or LCD display or the like; or an audio means, such as a voice alarm or sound alarm or the like; or any other means of alerting the vehicle operator. The system 10 may include an interactive means for transmitting an input from a vehicle operator to the intelligent diagnostic system.

Figure 3:
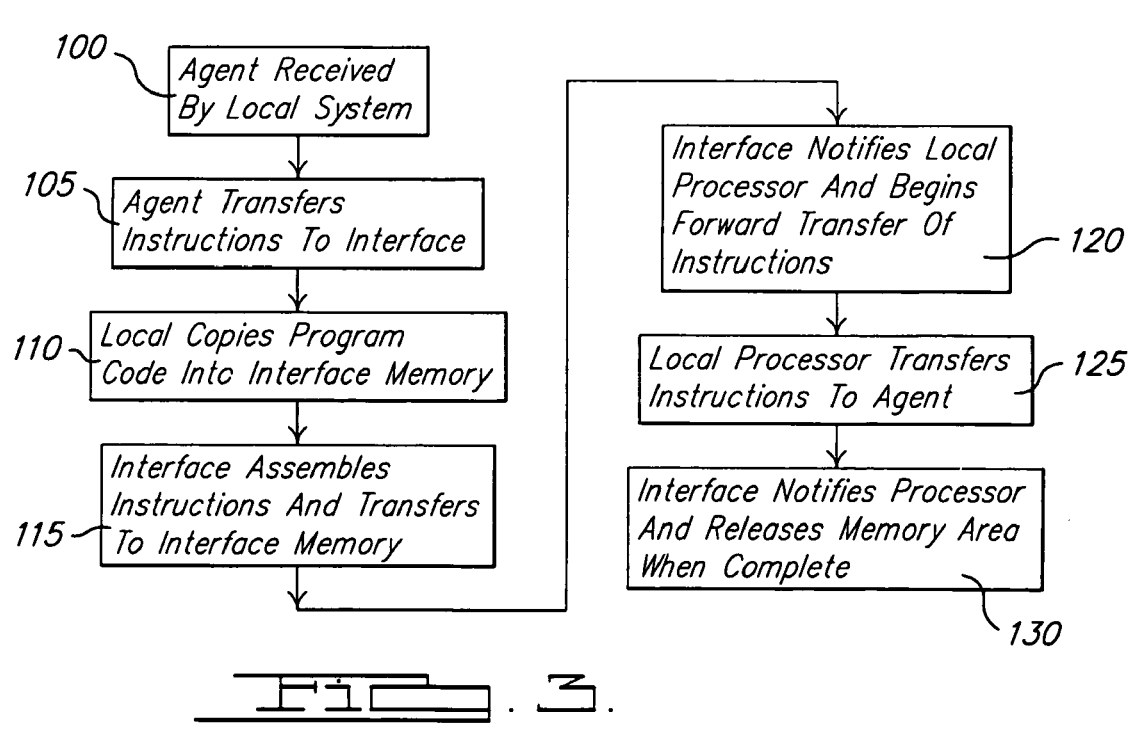
FIG. 3 is a flowchart illustrating the method of agent management using an agent interface in an electronic system using the system of FIG. 1, according to the present invention.

Referring to FIG. 3, a method of intelligent agent management using an agent interface 32 is provided. The method is implemented by the system 10 described with respect to FIGS. 1 and 2. The methodology assists in maintaining the size of the agent at a predetermined size that coincides with the load on the communication environment. The agent uses the interface 32 in executing the instructions carried by the agent 30 to the destination or local system 16. The methodology takes place in the destination environment, which in this case is at the vehicle level.

The methodology begins in block 100 when called for. It should be appreciated that the methodology may be called for as part of the execution of the agent management software program. In block 100 the agent is received within the local system 16 by the interface 32. It should be appreciated that the agent was previously identified. The interface 32 coordinates information and activities of the agent within the local system, and provides access to various resources within the local system 16. The methodology continues to block 105.

In block 105, the agent 30 transfers the instructions 42 that it carries over to the interface 32. The instructions 42, as previously described, includes detailed information regarding the task to be executed by the agent 30 within the local system 16.

In block 110, the interface copies predetermined information 44 maintained in the local system database 38 into the interface memory 40. For example, the stored information 44 may include program code or other data relevant to the agent and the instructions carried by the agent.

The methodology advances to block 115 and the interface processor 40 assembles together the stored information 44 from the local database 38 and processing procedure or instructions 42 from the agent into a single set of operating instructions 46. Per the agent 30, these operating instructions 46 may be forwarded to a memory portion of the processor.

The methodology advances to block 120 and the interface 32 notifies the local system processor 34 that the assembled operating instructions 46 are available and begins the forward transfer of such operating instructions 46 to the local system processor 34. Preferably, the operating instructions 46 includes complete instructions for work to be executed by the agent 32. The instructions may be in the form of executable program code. One example of a work instruction is to sense a temperature of a predetermined component. Another example of a work instruction is to sense a speed of the vehicle. The local system processor 34 may further process the information for use by the agent 30.

In block 125, the instructions are transferred from the local system processor 34 to the agent 30. The agent 30 executes the instructions and collects the data. The data may be stored in the local agent's database 38. Preferably, the data or information maintained in an agent database 31 is adaptively updated. That is, the newly learned information is added to the database and modifies the existing information in the database. The methodology may encrypt the information obtained by the agent through the local application program, using an encryption technique, as previously described. It should be appreciated that the encryption steps improve the security of the system 10.

In block 130, the interface 32 notifies that local system processor 34 that the agent's work is complete, and the local system 16 releases the memory area of the processor for other activities. The memory area deletes the information stored in the reserved memory area of the processor 34 when it is no longer needed. For example, the information is deleted when the receiving agent 30 completes execution of its program instruction 46. It should be appreciated that this memory space is now available for other uses.

Advantageously, the consistency and accuracy of the information is improved through management of communications within the system. An advantage of this methodology is that it utilizes existing hardware.

It should be appreciated that the methodology may include other steps necessary for the implementation of the method. Further, the steps may be executed in another order, while achieving the same result. It should also be appreciated that the methodology may be implemented in an iterative manner.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of intelligent agent management using an agent interface within an intelligent agent system for a vehicle, said method including the steps of:
    receiving an agent by a local intelligent agent system for the vehicle, wherein the agent includes a processor and a memory associated with the processor and the local system includes a processor having a memory and a database;
    transferring instructions carried by the agent to an interface within the local system via a communication network, wherein the interface includes a memory and a processor and the instructions includes information regarding a task to be performed by the agent;
    copying predetermined information from a host system database to the interface via the communications network;
    assembling together the agent instructions and information stored in the local system memory by the interface processor to produce assembled operating instructions;
    transferring the assembled operating instructions from the interface to the local system processor;
    transferring the assembled operating instructions from the local system processor to the agent; and
    executing the assembled operating instructions by the agent.

2. A method as set forth in claim 1 further including the step of the interface notifying the local system processor that the memory of the processor can be released for other uses.

3. A method as set forth in claim 1 wherein the assembled operating instructions includes executable code for the task to be performed by the agent.

4. A method as set forth in claim 1 further including the step of using the assembled operating instructions by the agent for vehicle diagnostics.

5. A method of intelligent agent management using an agent interface within an intelligent agent system for a vehicle, said method including the steps of:
    receiving an agent by a local intelligent agent system for the vehicle, wherein the agent includes a processor and a memory associated with the processor and the local system includes a processor having a memory and a database;
    transferring instructions carried by the agent to an interface within the local system via communications network, wherein the interface includes a memory and a processor and the instructions includes information regarding a task to be performed by the agent;
    copying predetermined information from a host system database to the interface via the communications network;
    assembling together the agent instructions and information stored in the local system memory by the interface processor to produce assembled operating instructions;
    transferring the assembled operating instructions from the interface to the local system processor;
    transferring the assembled operating instructions from the local system processor to the agent;
    executing the assembled operating instructions by the agent; and
    notifying the local system processor that the memory of the processor can be released for other uses.

6. A method as set forth in claim 5 wherein the assembled operating instructions includes executable code for the task to be performed by the agent.

7. A method as set forth in claim 5 further including the step of using the assembled instructions by the agent for vehicle diagnostics.

8. A system of intelligent agent management using an agent interface within an intelligent agent system for a vehicle, comprising:
    a host system within the intelligent agent system, wherein the host system includes a processor, a memory associated with the processor, means for input/output communication, and a database;
    a local system in communication with the host system via a communications network, wherein the local system includes a processor, a memory associated with the processor, a means for input/output communication, and a database;
    an intelligent agent in communication with the host system and the local system via the communication network, wherein the intelligent agent include a processor and a memory associated with the processor, and instructions stored within the processor memory regarding a task to be performed by the agent;

an interface within the local system, wherein the interface includes a processor and a memory associated with the processor and the interface;

wherein the interface copies predetermined information from the host system database into the memory portion of the interface via the communication network, the interface processor assembles the agent instructions together with the information stored in the local system memory to produce assembled operating instructions, the interface transfers the assembled operating instructions to the local system processor, and the local system processor transfers the assembled operating instructions to the agent for execution by the agent.

* * * * *